United States Patent [19]
Kaharu et al.

[11] Patent Number: 5,274,673
[45] Date of Patent: Dec. 28, 1993

[54] OPTICAL BUS TRANSMISSION METHOD AND TRANSMITTING-SIDE ENCODER AND RECEIVING-SIDE DECODER THEREFOR

[75] Inventors: Takeo Kaharu; Masato Shimamura; Yuzo Kohsaka; Shuichi Aihara; Kousuke Maezawa; Mitsuru Koike, all of Tokyo, Japan

[73] Assignee: Japan Aviation Electronics Industry Limited, Tokyo, Japan

[21] Appl. No.: 973,713

[22] Filed: Nov. 9, 1992

Related U.S. Application Data

[62] Division of Ser. No. 717,675, Jun. 19, 1991, Pat. No. 5,220,582.

[30] Foreign Application Priority Data

Jun. 22, 1990 [JP] Japan .................................. 2-165294

[51] Int. Cl.$^5$ ............................................. H04L 27/10
[52] U.S. Cl. ............................................ 375/55; 375/87; 359/183
[58] Field of Search .................. 375/36, 55, 87, 59; 359/152, 153, 154, 158, 181, 183; 341/70

[56] References Cited

U.S. PATENT DOCUMENTS

| | | |
|---|---|---|
| 4,420,842 | 12/1983 | Kuhn ................................. 359/181 |
| 4,562,582 | 12/1985 | Tokura ............................... 375/87 |
| 4,847,831 | 7/1989 | Spiesman et al. ................. 359/158 |
| 4,847,873 | 7/1989 | Kuwaoka et al. ................. 359/158 |
| 4,961,205 | 10/1990 | Kuwaoka ........................... 375/36 |
| 5,130,836 | 7/1992 | Kaharu et al. .................... 359/158 |

Primary Examiner—Stephen Chin
Attorney, Agent, or Firm—Pollock, VandeSande and Priddy

[57] ABSTRACT

In each terminal connected to an optical bus a narrow pulse synchronized with the rise of a pre-synchronizing pulse appended to the head of the one digital signal TXN of Manchester-biphase signals, a narrow pulse synchronized with the rise of each pulse of the other Manchester-biphase digital signal TXO and a narrow pulse occurring every fixed period of time during the duration of each pulse are produced, and these narrow pulses are converted into optical signals, which are provided as an optical pulse train to the optical bus. In each terminal optical pulses received from the optical bus are converted into an electric signal, which is separated into its leading pulse and the subsequent pulses, a synchronizing pulse is produced in synchronization with the leading pulse, the subsequent pulses are each converted into a pulse of a fixed width to regenerate the signal TXO, and the regenerated signal TXO is polarity inverted and then combined with the pre-synchronizing pulse to regenerate the signal TXN.

4 Claims, 12 Drawing Sheets

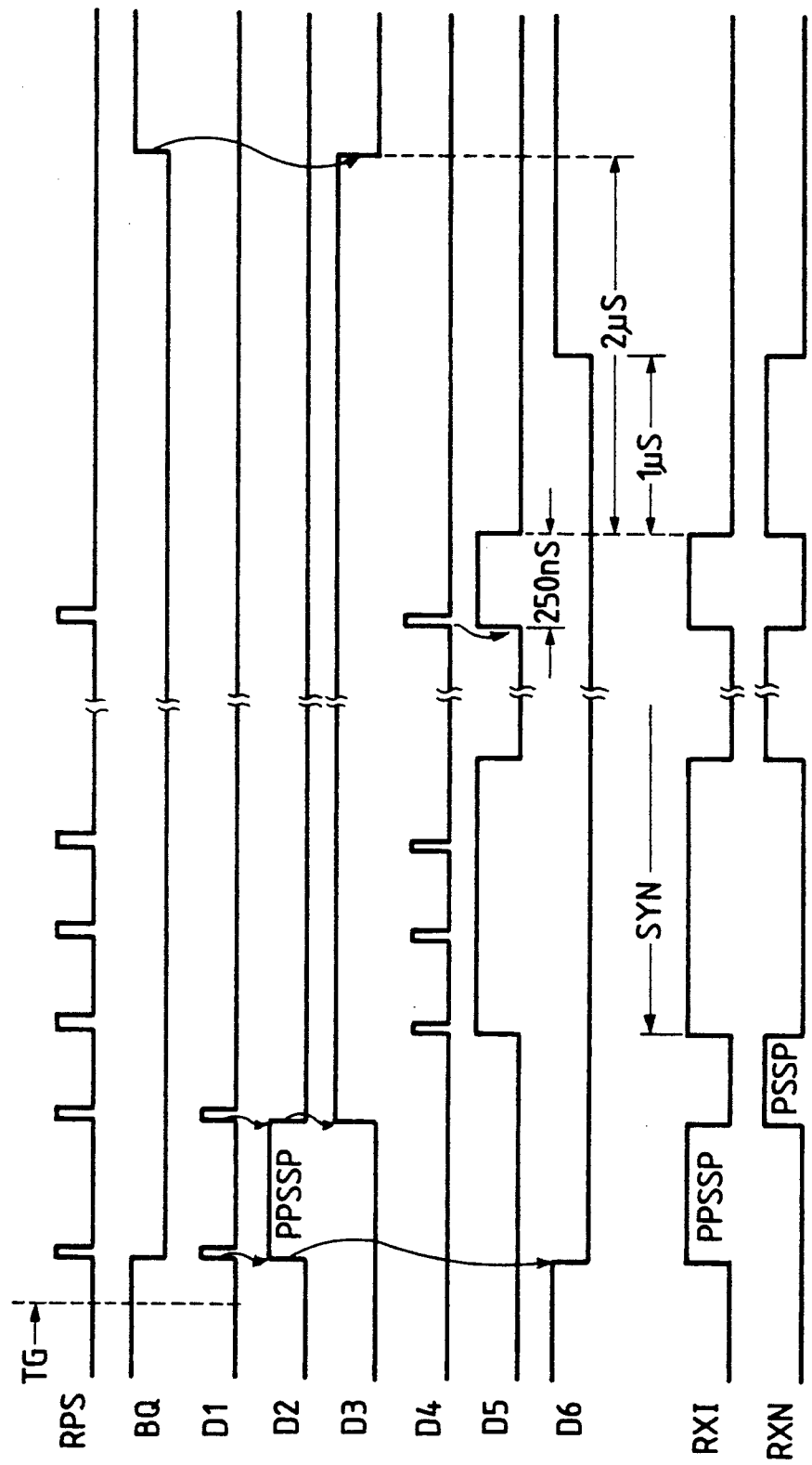

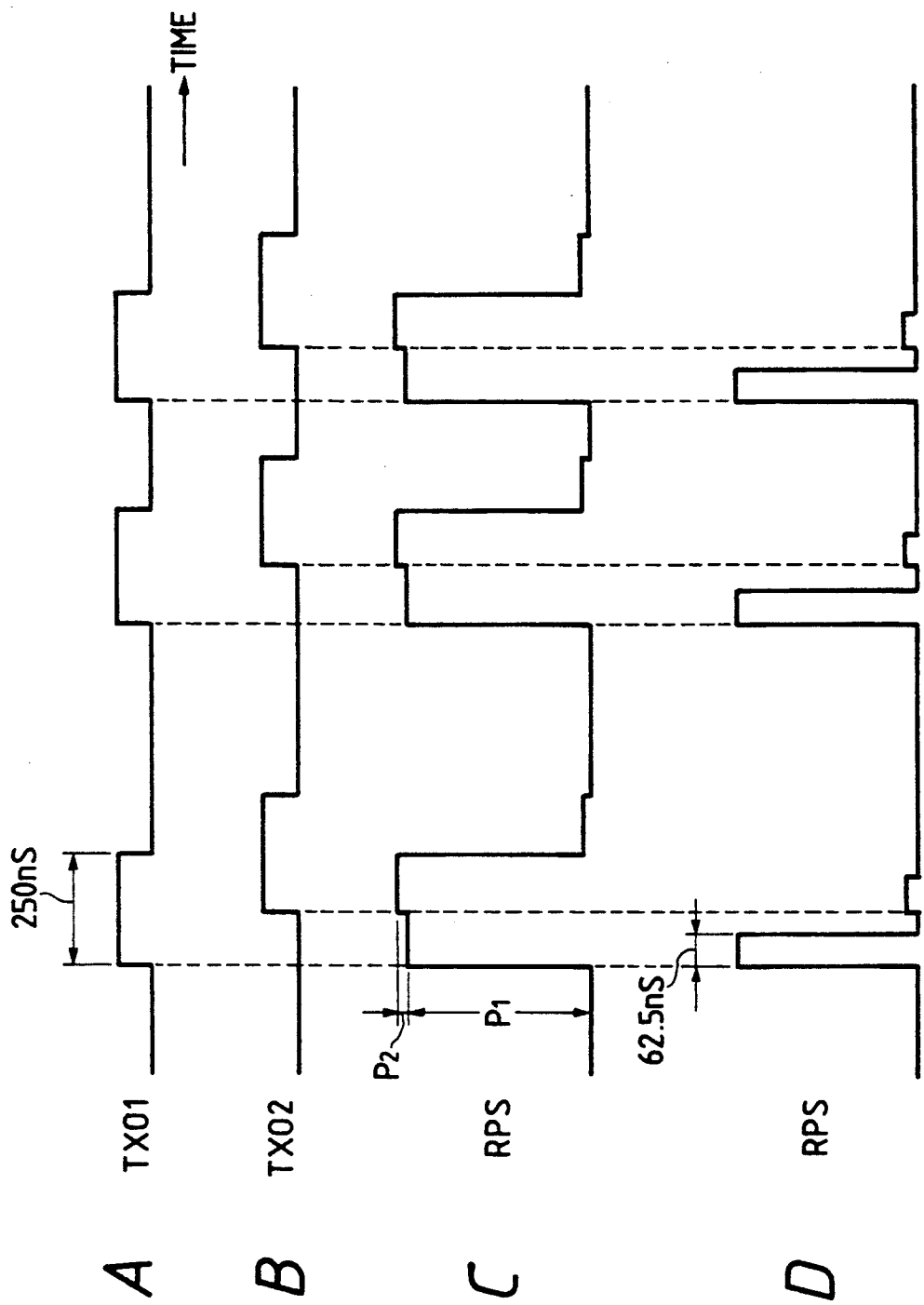

OPTICAL BUS TRANSMISSION METHOD AND TRANSMITTING-SIDE ENCODER AND RECEIVING-SIDE DECODER THEREFOR

This is a divisional of application Ser. No. 07/717,675 filed on Jun. 19, 1991 U.S. Pat. No. 5,220,582.

BACKGROUND OF THE INVENTION

The present invention relates to an optical bus transmission method in which Manchester-biphase digital electric signals are converted into optical signals and transmitted over an optical bus. The invention also pertains to a transmitting-side encoder and a receiving-side decoder therefor.

There is known a DATAC (Digital Automous Terminal Access Communication) system as LAN (Local Area Network) introduced for digital data communication between various pieces of electronic equipment loaded on aircraft (for example, see the magazine "NEC Giho," Vol. 39, No. 12, 1986, pp 160–167). The DATAC system transmits data as a digital signal of the Manchester biphase. The digital signal of the Manchester biphase is transmitted as two pulse trains of TXO and TXN signals, accordingly two buses or transmission lines are needed for transmitting them separately of each other.

It is deemed possible to employ an optical bus in the DATAC system, but two way transmission is impossible with a single optical bus because of the use of an optical coupler. In this instance, a total of four optical transmission lines are needed, two for optical transmission of the TXO signal in two directions and two for optical transmission of the TXN signal in two directions—this inevitably enlarges the scale of the system.

Moreover, when many terminals are connected to the optical bus, the total transmission loss by the optical couplers is relatively large, and consequently, an optical signal received from a near terminal and an optical signal received from a distant terminal greatly differ in level. If provision is made for receiving even an optical signal of a low level, there is a possibility that the receiver becomes saturated in the case of receiving an optical signal of a high level and that seriously distorts its waveform, resulting in a failure to detect a correct pulse.

Further, in order for each terminal to receive a signal at a sufficient level, it is necessary to provide an optical signal of large optical power on the optical bus, but if pulses of a conventional electric signal are used intact, then a signal of large optical power cannot be output.

When a plurality of terminals simultaneously output signals to the bus, it is impossible to obtain correct data. On this account, each terminal starts transmission after detecting what is called a bus quiet state in which no carrier is present on the bus. When a plurality of signals are simultaneously provided onto the bus by some cause, that is, when a so-called signal collision state occurs, each terminal detects it and stops its signal transmission. With the prior art system of the type that replaces an electric signal with an optical one, when a signal of large level and a signal of small level, both relatively large in their pulse width, overlap, it is difficult to detect the collision of such two signals.

SUMMARY OF THE INVENTION

It is therefore an object of the present invention to provide an optical bus transmission method which permits the reduction of the scale of the optical bus used and the enlargement of the dynamic range of the receiving level and a transmitting-side encoder and a receiving-side decoder for implementing such an optical bus transmission method.

According to the present invention, a narrow pulse synchronized with the rise of a leading pulse of a digital signal TXN in the Manchester-biphase digital signals TXO and TXN, a narrow pulse synchronized with the rise of each pulse of the signal TXO and a narrow pulse occurring every predetermined period of time in the duration of each pulse are produced in a terminal. These narrow pulses are converted into optical signals, which are transmitted as a train of optical pulses to an optical bus. In the terminal, optical pulses received from the optical bus are converted into an electric signal, which is separated into its leading pulse and the subsequent pulses. The latter pulses are converted into pulses whose pulse width is equal to the above-mentioned predetermined period of time to thereby reproduce the above-said signal TXO, and a polarity inverted version of the reproduced signal TXO and the above-noted leading pulse are combined to reproduce the signal TXN.

BRIEF DESCRIPTION OF THE DRAWINGS

FIG. 11 is a timing chart for explaining the operation of the decoder in FIG. 10; and FIG. 12 is a timing chart showing an example of a signal collision.

DESCRIPTION OF THE PREFERRED EMBODIMENTS

Figure 1:
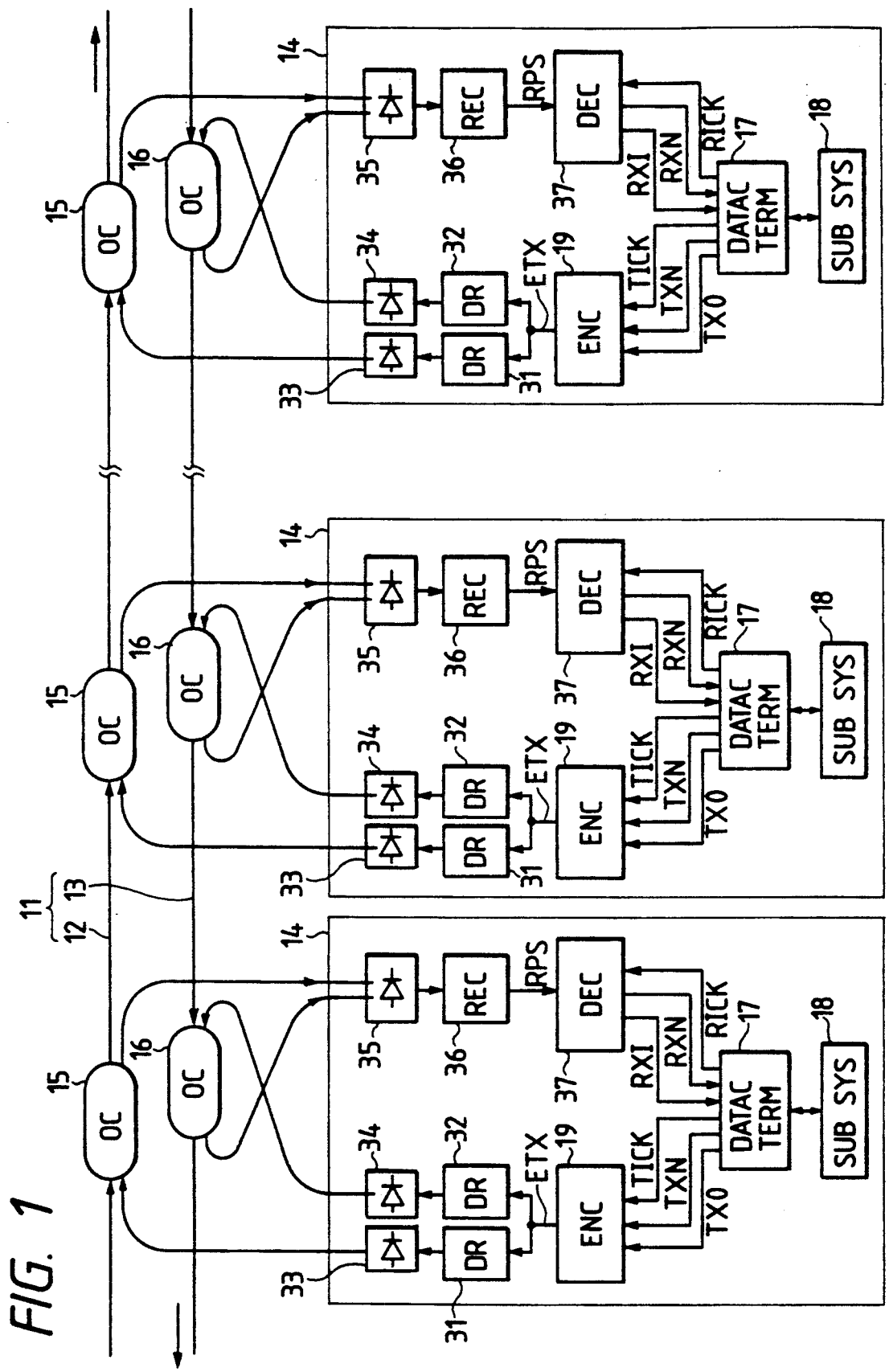
FIG. 1 is a block diagram illustrating an embodiment of the present invention.

FIG. 1 illustrates in block form a transmission system which implements a method of the present invention. An optical bus 11 is composed of an optical fiber transmission line 12 for transmission to the right and an optical fiber transmission line 13 for transmission to the left, a plurality of terminals 14 being coupled to the transmission lines 12 and 13 through optical couplers 15 and 16, respectively. Each terminal 14 includes an element for connection to a bus of the conventional DATAC system, that is, a DATAC terminal 17, through which data is transmitted and received between a subsystem 18 and the bus. The DATAC terminal 17 outputs, as Manchester-biphase digital signals TXO and TXN, the data to be transmitted from the subsystem 18 and supplies received Manchester-biphase digital signals RXI and RXN to the subsystem 18 after converting them into data.

Figure 2:
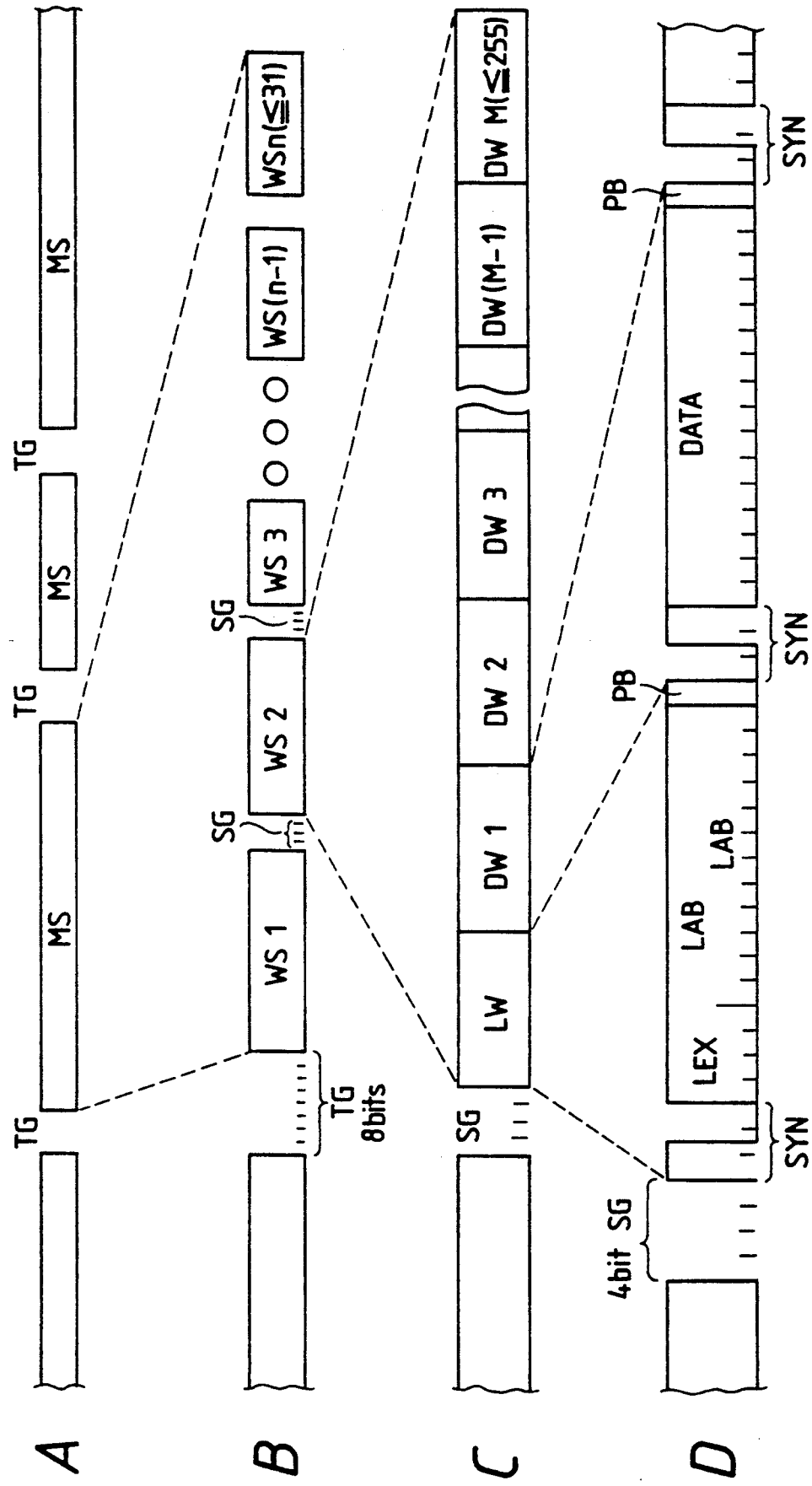
FIG. 2 is a diagram showing a message structure of the DATAC system.

The message structure of data from the DATAC terminal 17 prior to the conversion into the digital signals TXO and TXN is such as depicted in FIG. 2, which is the same as shown in the aforementioned literature. The words to be transferred are classified into a label word LW and a data word DW as shown on Rows C and D in FIG. 2, and they are each 20 bits long. The label word LW is composed of three synchronizing bits SYN (1.5 high-level bits plus 1.5 low-level bits), four label extension bits LEX, 12 label bits LAB, 16 data bits DATA and one parity bit PB. The data word DW is composed of three synchronizing bits SYN, 16 data bits DATA and one parity bit PB. As shown on rows B and C in FIG. 2, the label word LW and a plurality of data words DW constitute a word string WS, which is the minimum transmission unit. The word string WS is headed by one label word LW, followed by a data word DW which is 0 to 255 words long. Each DATAC terminal 17 can transmit 1 to 31 word strings WS in succession and the transmission unit composed of such plural word strings WS will hereinafter be referred to as a message MS. The word strings WS in the message MS are separated by a four-bit string gap SG, and messages MS are separated by a terminal gap TG of eight bits or more.

Figure 3:
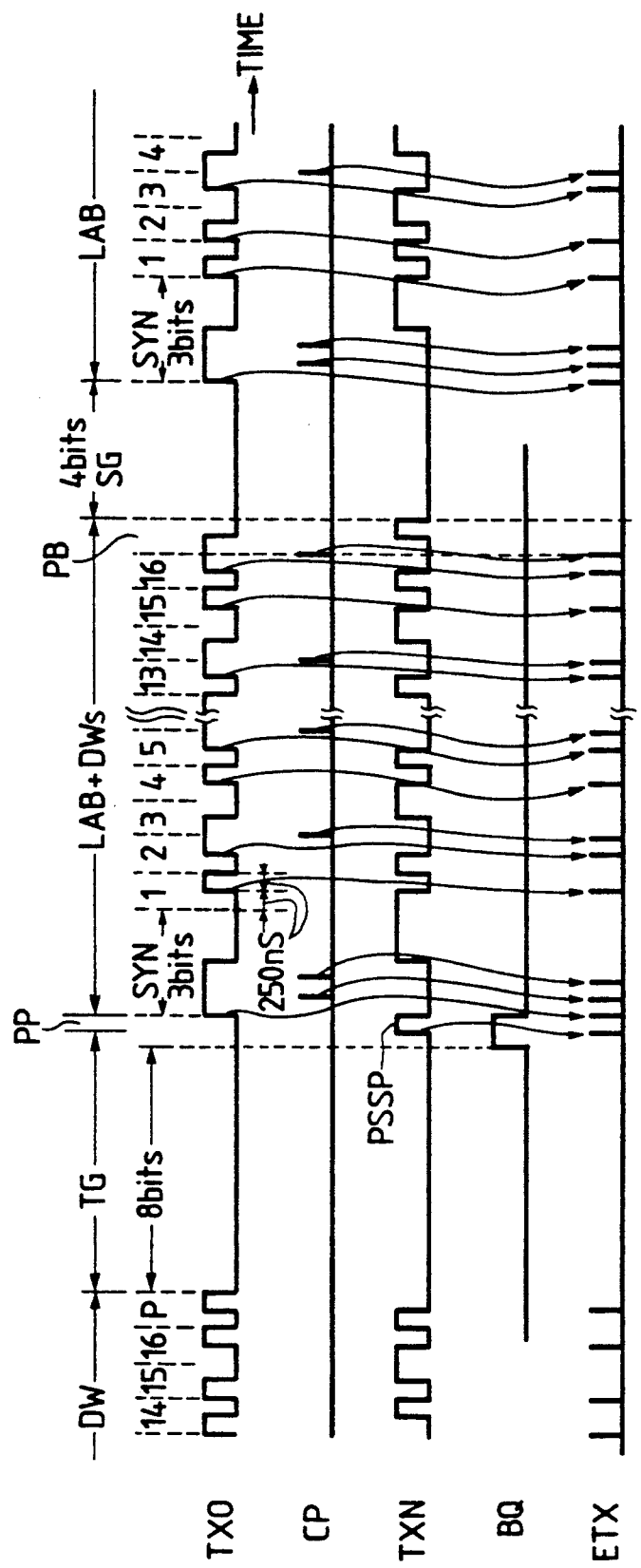
FIG. 3 is a timing chart showing an example in which biphase signals TXO and TXN are rendered by an encoder into a train of pulses.

The DATAC terminal 17 outputs such a message MS as the Manchester-biphase digital signals TXO and TXN. FIG. 3 shows an example of these digital signals TXO and TXN. The message MS following the terminal gap TG is immediately preceded by a pre-synchronizing pulse period PP, in which a pre-synchronizing pulse (PSSP) is generated. Next, the synchronizing signal SYN, which rises up in synchronization with the fall of the pulse PSSP and remains high-level for a 1.5-bit period and then low-level for a 1.5-bit period, is provided as the signal TXO, which is then added with a Manchester code which is high-level for the first or second half period of each data bit, depending on whether each data bit is "1" or "0", and finally the parity bit PB is appended. The signal TXN is a polarity-inverted version of the signal TXO immediately after the pre-synchronizing pulse PSSP and ends with a pulse of a 0.5-bit width which is an inverted version of the parity bit PB of the signal TXO. The width of the pre-synchronizing pulse (PSSP) immediately preceding each message MS is approximately in the range of 100 to 500 nS and is variable, but other pulses have widths equal to integral multiples of 250 nS.

During signal reception the DATAC terminal 17 extracts necessary data from received Manchester-biphase digital signals RXI (identical with the signal TXO) and RXN (identical with the signal TXN) and provides the data to the subsystem 18.

In the present invention, the Manchester-biphase digital signals TXO and TXN and a clock TICK of 32-MHz frequency (with a period of 31.25 nS) from the DATAC terminal 17 are input into an encoder 19. As indicated by ETX in FIG. 3, the encoder 19 outputs a narrow pulse in synchronization with the rise of the leading pulse of the signal TXN, i.e. the pre-synchronizing pulse PSSP, and then a narrow pulse in synchronization with the rise of each pulse of the signal TXO and, in the duration of the pulse of the signal TXO, the encoder 19 outputs narrow pulses at fixed intervals, 250 nS in this example. These pulses are output as a train of pulses ETX.

Figure 4:
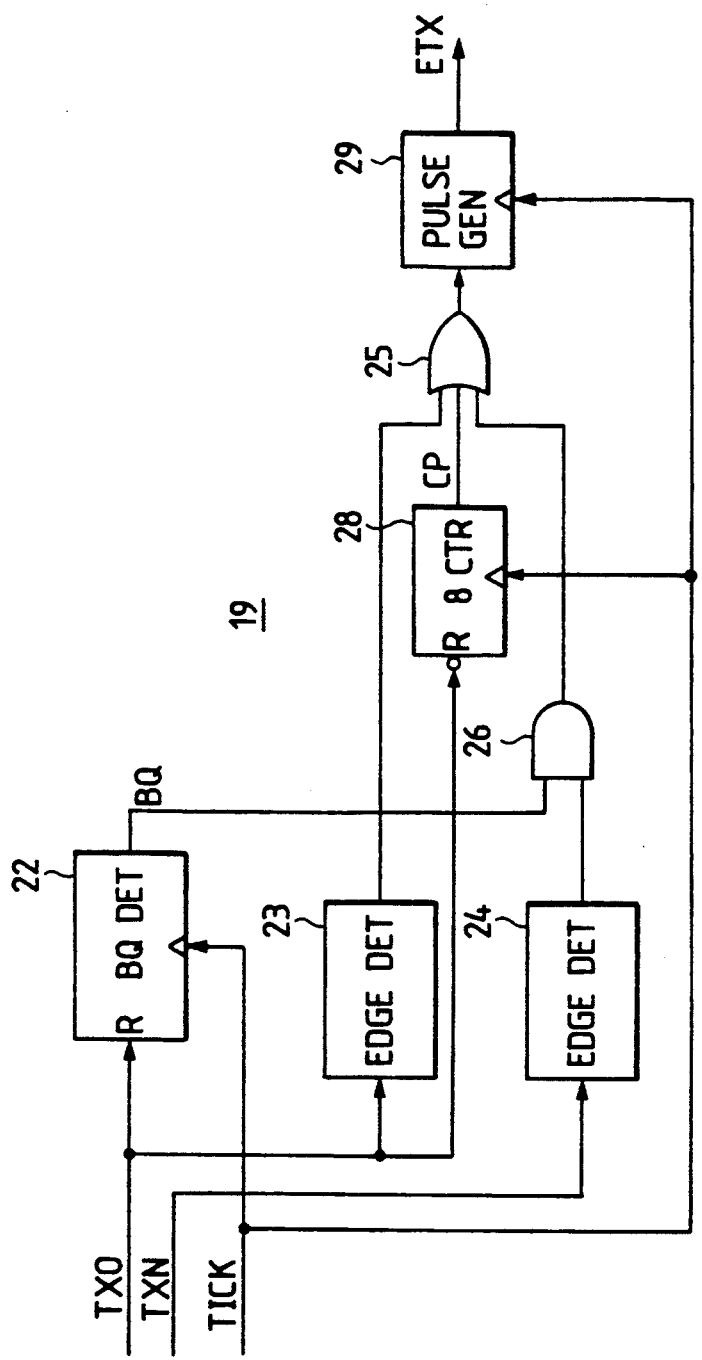
FIG. 4 is a block diagram illustrating a specific operative example of an encoder 19.

The encoder 19 has such a construction as shown in FIG. 4, in which the signal TXO is applied to a reset terminal R of a bus quiet detector 22 which is formed by a counter. The bus quiet detector 22 always counts the clock TICK of the 31.25-nS period and yields a high-level output "1" when it is not reset for over an 8-bit period (500 nS × 8 = 4 μS), that is, upon counting the clock TICK more than 128 times. In other words, upon detecting the completion of the sending of a message, the output BQ of the bus quiet detector 22 goes to the high level "1". The rises of the pulses of the signals TXO and TXN are detected by edge detectors 23 and 24, respectively. The edge detector 23 supplies an OR gate 25 with a pulse indicating each positive-going edge of the signal TXO. The output of the edge detector 24 and the output BQ of the bus quiet detector 22 are provided to a gate 26, which extracts only the rise or positive-going edge of the pre-synchronizing pulse PSSP among pulses indicating positive-going edges of the signal TXN and applies it to the OR gate 25. The clock TICK is counted by an octal counter 28, which is reset during each low-level period of the signal TXO. A carry output of the octal counter 28 is applied to the OR gate 25. After the positive-going edge detection output of the pre-synchronizing pulse PSSP passes through the gate 26, the output BQ of the bus quiet detector 22 is made low by the synchronizing pulse SYN of the signal TXO, disabling the gate 26. During the high-level period of the pulse of the signal TXO the octal counter 28 outputs a pulse CP upon each counting of eight pulses of the clock TICK of the 31.25-nS period after the rise of the pulse of the signal TXO, that is, every 250 nS. Accordingly, the OR gate 25 is supplied with all of the positive-going edge detection pulses of the signal TXO from the edge detector 23, the pulse CP provided from the counter 28 every 250 nS during the high-level period of the signal TXO and the positive-going edge detection output of the pre-synchronizing pulse PSSP of the signal TXN from the edge detector 24. Upon each occurrence of an output pulse from the OR gate 25, a pulse generator 29 generates a narrow pulse having a pulse width of 62.5 nS. The output pulse from the pulse generator 29 is the output pulse ETX of the encoder 19 (see FIG. 3). The width of each output pulse from the pulse generator 29 is equal to two periods of the clock TICK.

Referring back to FIG. 1, the narrow pulse train ETX from the encoder 19 is applied via drivers 31 and 32 to light emitting elements 33 and 34, such as light emitting diodes, by which it is converted into optical pulse trains, which are provided onto the optical transmission lines 12 and 13 via the optical couplers 15 and 16, respectively.

On the other hand, optical pulses transmitted over the optical transmission lines 12 and 13 are split by the optical couplers 15 and 16, respectively, and are applied to a photodiode or similar photodetector 35 of the terminal 14 for conversion into electric signals. The electric signals are amplified and waveform shaped by a receiver circuit 36 and its output pulse train RPS is reproduced by a decoder 37 into signals RXI and RXN corresponding to the signals TXO and TXN of the transmitting side, respectively. The reproduced signals RXI and RXN are provided to the DATAC terminal 17.

The reproduction by the decoder 37 is performed on the basis of each edge of the input pulse (the leading edge, for example). A narrow pulse which is received for the first time after a no-signal-receiving state, that is, the bus quiet state of the 8-bit or more period, indicates the rise of the pre-synchronizing pulse (PSSP) of the signal TXN and a narrow pulse input thereafter is a pulse corresponding to the rise of each pulse of the signal TXO or corresponding to the duration of its pulse. Accordingly, based on their leading edges, the narrow pulses after the pulse corresponding to the rise of the pre-synchronizing pulse PSSP are converted into pulses of a width equal to the pulse interval of narrow pulses which are produced during the pulse duration at the transmitting side, that is, a pulse width of 250 nS in the above example. By this, the signal RXI corresponding to the signal TXO at the transmitting side is reproduced, and the signal RXN corresponding to the signal TXN is reproduced using a polarity-inverted version of the signal RXI and the leading narrow pulse.

Figure 5:
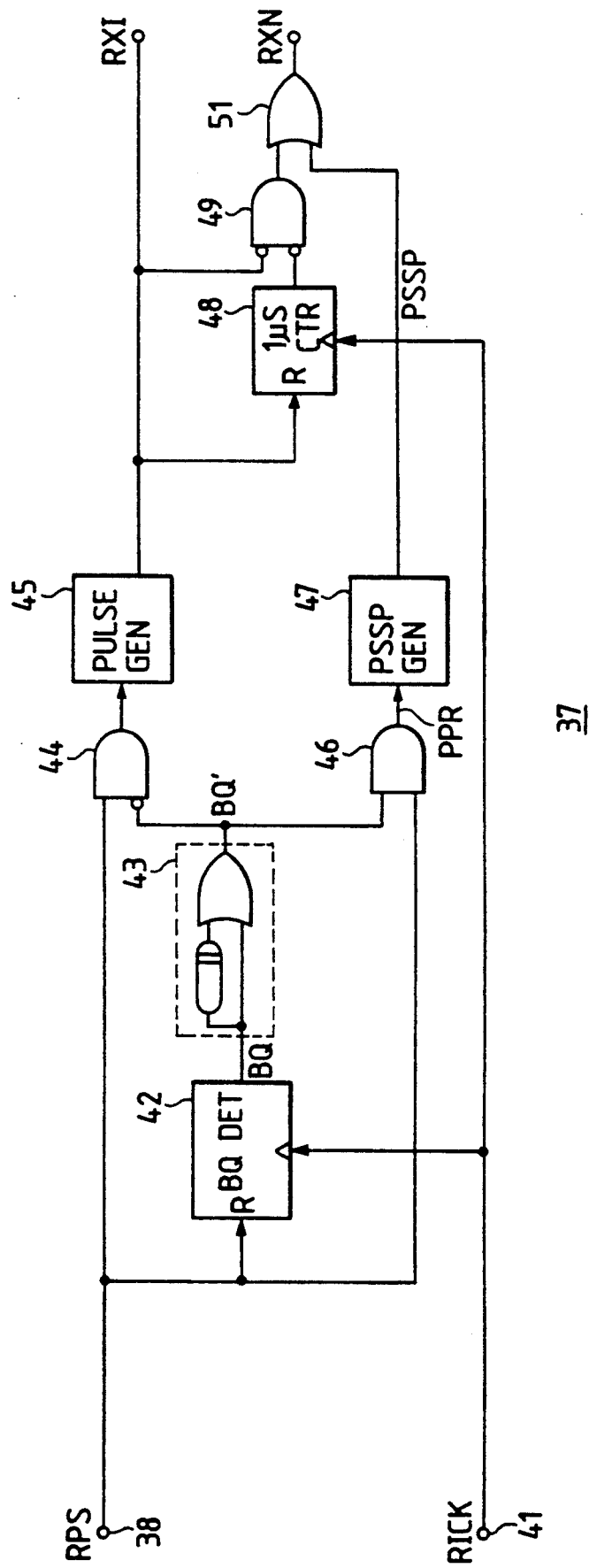
FIG. 5 is a block diagram showing a specific operative example of a decoder 37.
Figure 6:
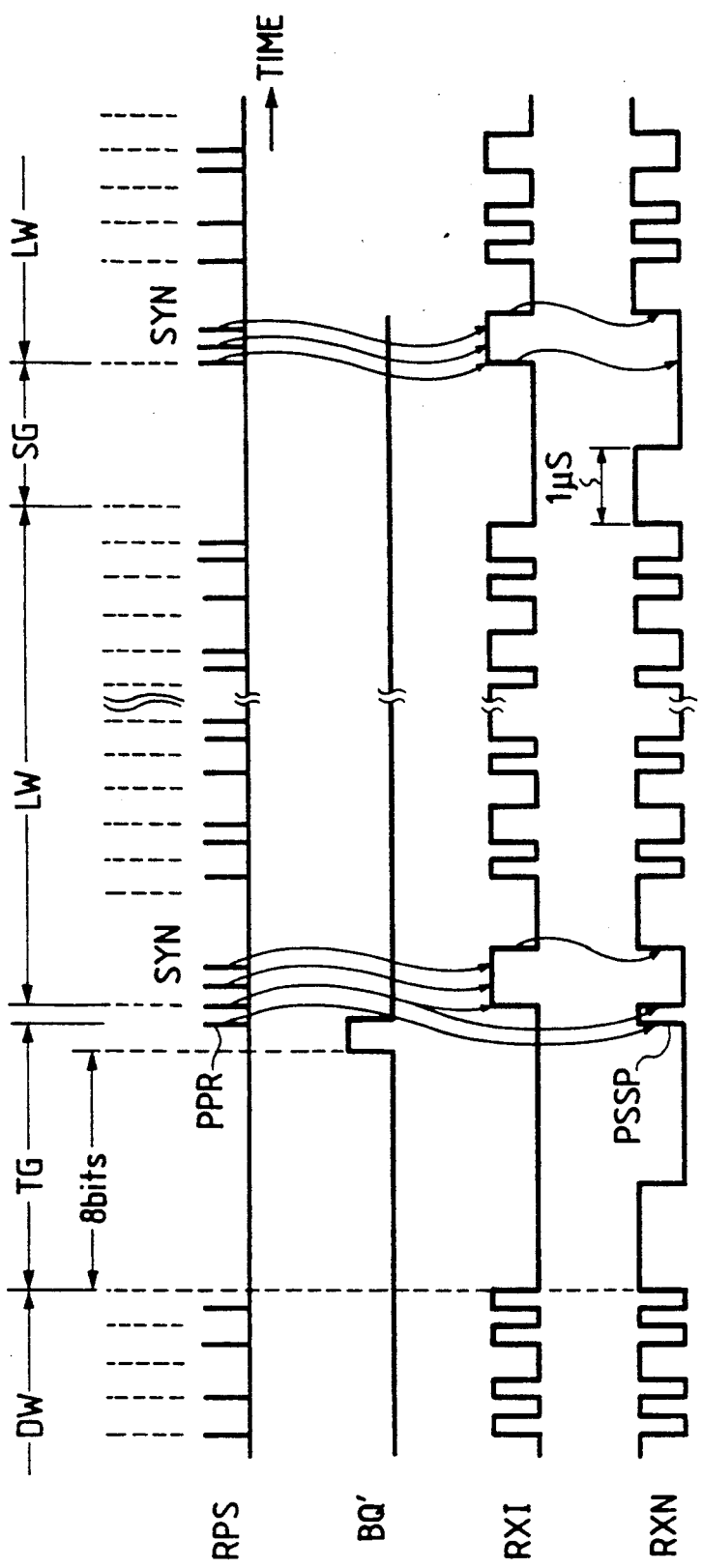
FIG. 6 is a timing chart showing an example of producing biphase signals RXI and RXN from a train of pulses.

FIG. 5 illustrates a specific operative example of the decoder 37 and FIG. 6 a timing chart for explaining an example of its operation. A pulse train RPS from a terminal 38 is provided to a bus quiet detector 42 formed by a counter. The counter is reset by the pulse train RPS. The bus quiet detector 42 counts receiving clock pulses RICK of a 32-MHz frequency which are applied to a terminal 41 and, when it is not reset for the terminal gap period, that is, for over an eight-bit period (500 nS × 8 = 4 μS, i.e. for a period corresponding to 128 clock pulses RICK), the output BQ of the bus quiet detector 42 goes high. Then when the bus quiet detector 42 is reset by that leading pulse PPR of the pulse train RPS which indicates the rise of the pre-synchronizing pulse PSSP, the output BQ goes low again. The fall of the output pulse from the bus quiet detector 42 is delayed by a pulse expander 43 and is output as a masking pulse BQ'. The masking pulse BQ' is applied to a gate 44 to disable it for the duration of the pulse BQ', eliminating the leading pulse PPR from the input pulse train RPS. At the same time, the masking pulse BQ' is applied to a gate 46 to enable it for the duration of the pulse BQ', permitting the passage therethrough of only the leading pulse PPR. A pulse generator 45 is formed by a one-shot multivibrator, for example, and when supplied with each of the pulses other than the leading pulse PPR, it outputs a pulse which is high-level for 250 nS. As a result of this, the decoded pulse train RXI is obtained. On the other hand, when supplied with the output pulse PPR of the gate 46, a pre-pulse generator 47 formed by a one-shot multivibrator, for example, generates a pre-pulse PSSP of a 250 nS width.

The output pulse of the pulse generator 45 is applied to a NOR gate 49, by which it is inverted in logic. The logic-inverted output is applied to a gate 51 and combined with the pre-pulse PSSP and the combined output is provided as the decoded pulse train RXN. A counter 48 is reset by each pulse from the pulse generator 45 on the one hand and counts the clock pulses RICK on the other hand. In this example, the counter 48 yields a high-level output upon each counting of 32 clock pulses RICK (i.e. a 1-μS period). Consequently, while the decoded pulse train RXI is obtained, the output of the counter 48 remains low, holding the gate 49 enabled. When the period of the string gap SG or terminal gap TG starts after completion of the pulse train RXI, the counter 48 yields a high-level output 1 μS after the start of the period, disabling the gate 49. Consequently, the decoded pulse train RXN is made low-level 1 μS after the start of the string gap SG or terminal gap TG.

As will be appreciated from the above, if the input pulse RPS is not applied to the terminal 38 for the eight-bit period, the output BQ of the bus quiet detector 42 and consequently the output BQ' of the pulse expander 43 rises to the high level "1". As shown in FIG. 6, the pulse PPR applied for the first time in this state indicates the rise of the pre-synchronizing pulse PSSP, and by the pulse PPR, the output BQ of the bus quiet detector 42 is made low-level "0" but at that time point the gate 46 is still open. Hence, the pulse PPR passes through the gate 46 and enters the pre-pulse generator 47, by which the pre-pulse PSSP is generated. After the fall of the output BQ the masking pulse BQ' falls, enabling the gate 44 but disabling the gate 46. Thereafter, the outputs BQ and BQ' are held low, because the pulse RPS is input within the eight-bit period. Accordingly, the pulses following the pulse PPR which is indicative of the rise of the pre-synchronizing pulse PSSP are derived from the signal TXO. These pulses are provided via the gate 44 to the pulse generator 45, which outputs a pulse of a 250 nS duration for each of the above pulses. As shown in FIG. 6, when input pulses are applied at intervals of 250 nS, the output pulse of the pulse generator 45 lasts for that period and has a pulse width which is an integral multiple of 250 nS. The output pulse signal TXO of the pulse generator 45 derived from the received pulses which have been produced based on the signal TXO is output as the signal RXI regenerated from the signal TXO. The signal RXI is applied to the NOR gate 49, from which is obtained the signal RXN corresponding to the signal TXN. When the received pulse signal RPS is not input for 1 μS, the output of the counter 48 goes high, forcibly making the signal RXN low. Accordingly, the pulse at the end of each word string of the signal RXN is longer than the corresponding pulse of the signal TXN but this does not affect the decoding of data.

Figure 7:
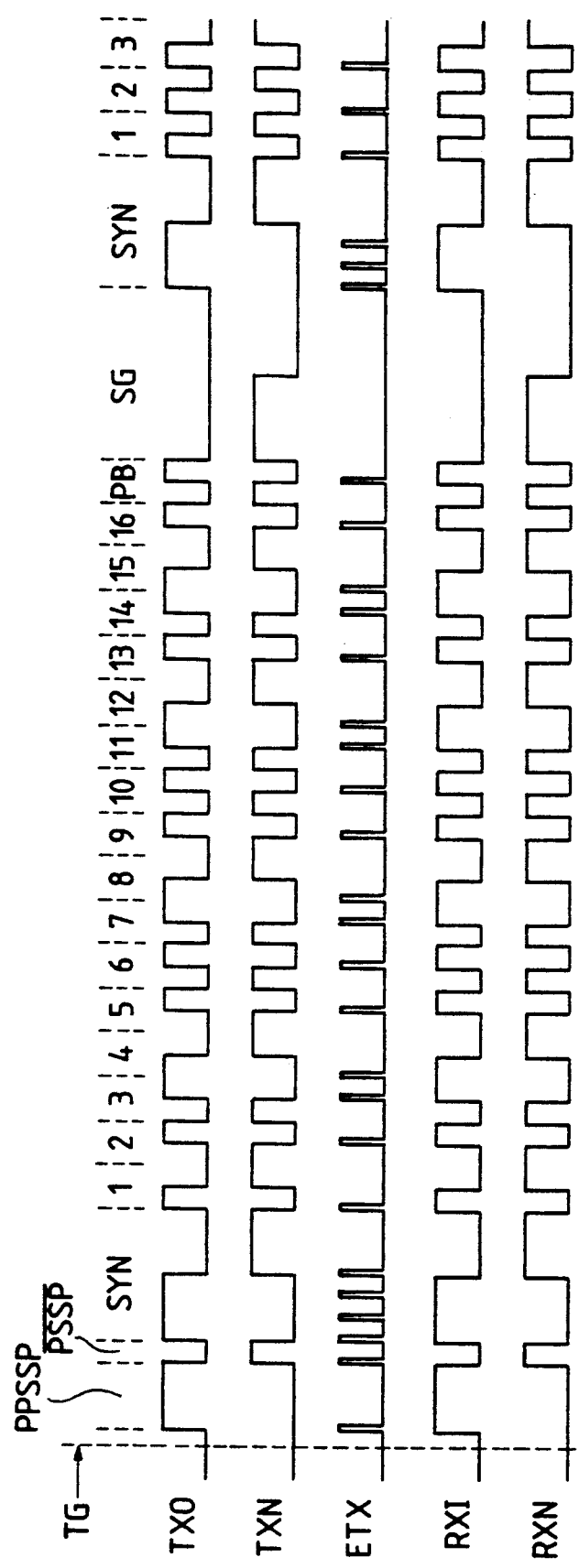
FIG. 7 is a timing chart for explaining an optical bus transmission method according to a second embodiment of the present invention.

FIG. 7 is a timing chart for explaining a second embodiment of the optical bus transmission method of the present invention. This embodiment is applied to a Manchester-biphase signal in the case where the pre-synchronizing pulse PSSP is also provided in the signal TXO in the biphase signals TXO and TXN which are output from the DATAC terminal 18. That is, it is considered not only that the pre-synchronizing pulse PSSP is provided in the signal TXN but also that a pre-synchronizing pulse PPSSP (hereinafter referred to as a primary pre-synchronizing pulse), which falls in synchronization with the above pre-synchronizing pulse PSSP, is provided in the signal TXO, as shown in FIG. 6. In such an instance, timing information on the rise-up time point of the pre-synchronizing pulse PSSP of the signal TXN can be obtained from the fall of the primary pre-synchronizing pulse PPSSP of the signal TXO; so that in this embodiment the signal TXN is not used but a sequence of transmission pulses are derived from the signal TXO alone and are transmitted and at the receiving side the Manchester-biphase signals RXI and RXN are decoded from the received pulse train. That is, the encoder 19 in FIG. 1 detects the primary pre-synchronizing pulse PPSSP of the signal TXO from the DATAC terminal 17 and generates narrow pulses indicating its rise and fall, respectively, and then generates narrow pulses at the rise of each pulse of the signal TXO and every fixed period of time within the duration of the signal, thus outputting the narrow pulse train ETX. At the receiving side, the decoder 37 re-generates the primary pre-synchronizing pulse PPSSP and the pre-synchronizing pulse PSSP from the received pulse train RPS (which is the same as the pulse train ETX) and decodes the Manchester-biphase signals RXI and RXN following them.

Figure 8:
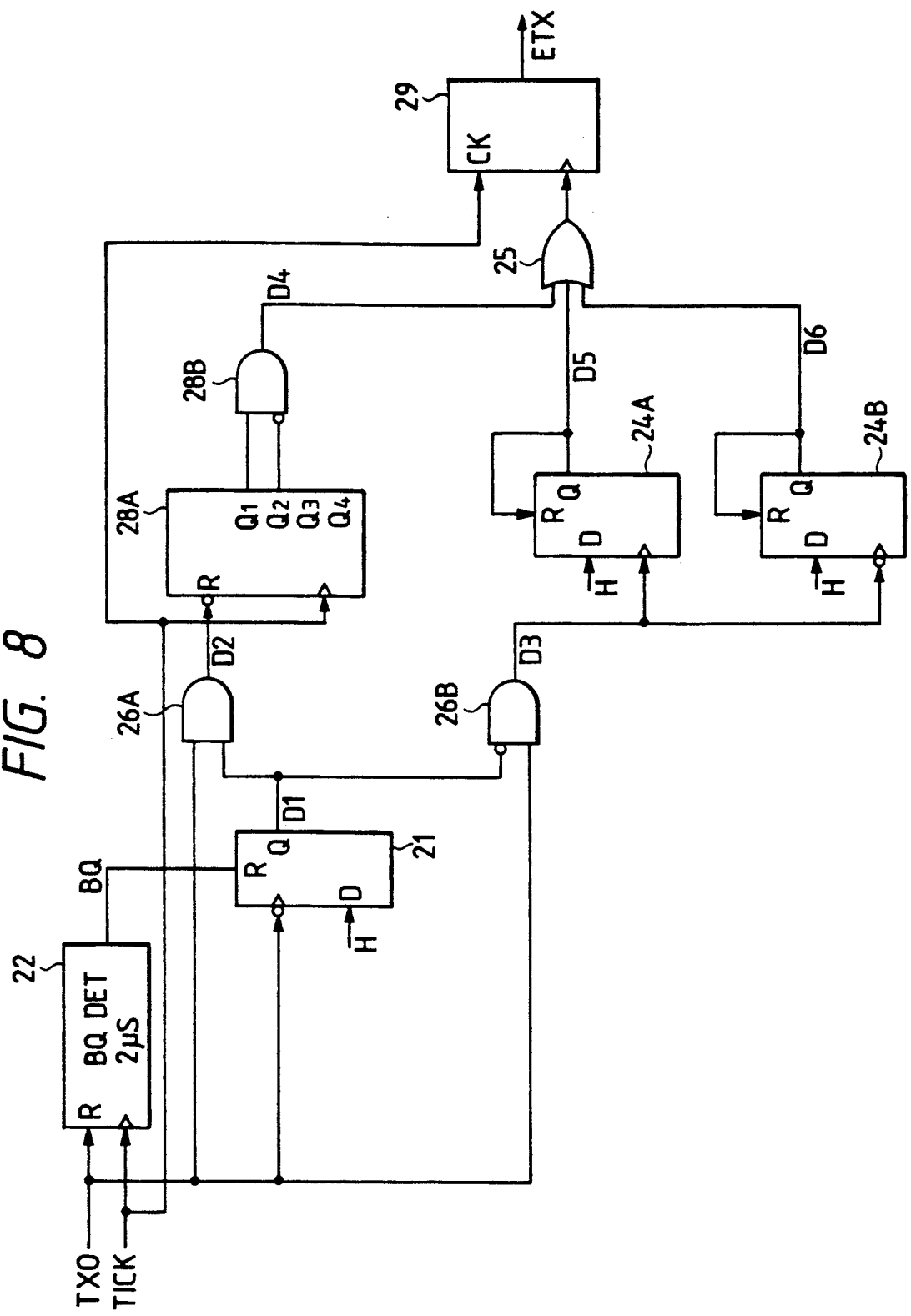
FIG. 8 is a block diagram illustrating an example of the construction of the encoder in the second embodiment.
Figure 9:
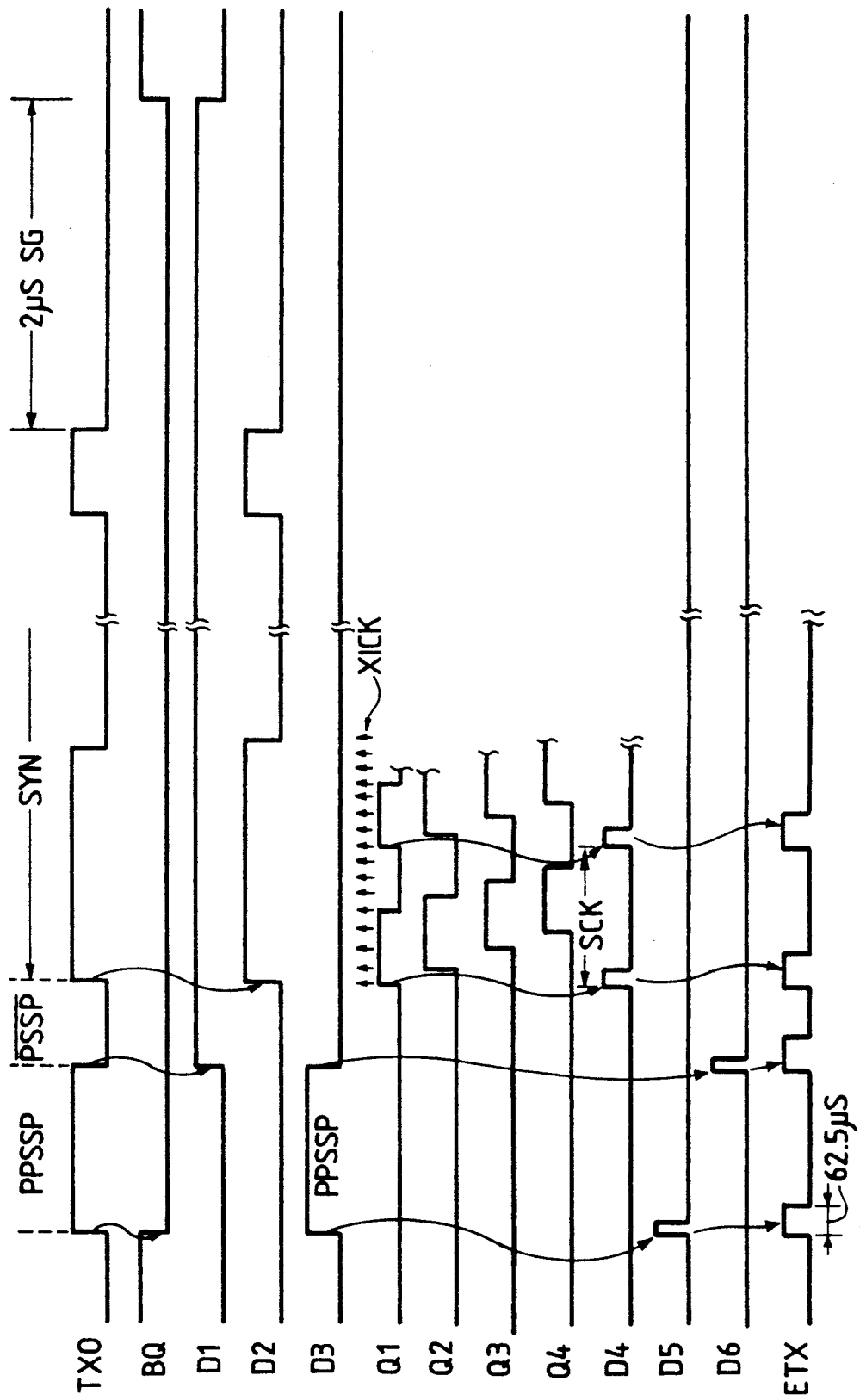
FIG. 9 is a block diagram illustrating an example the construction of the decoder in the second embodiment.

FIG. 8 illustrates an example of the construction of the encoder 19 for use in the transmission system described above in respect of FIG. 7, and FIG. 9 is a timing chart for explaining its operation. The signal TXO is applied to a reset terminal of the bus quiet detector 22 formed by a counter. Having counted 64 (2 $\mu$S) or more clock pulses TICK of a 31.25 nS (4 MHz) frequency, the counter 22 makes its output BQ high-level, indicating the terminal gap TG. The timing chart in FIG. 9 is shown to start with the state in which a flip-flop 21 is reset by the high level of the output BQ. When the first pulse (PPSSP) of the signal TXO is input in such a state, it is applied via a gate 26B to a flip-flop 24A. By the rise of the pulse PPSSP a high level is written into the flip-flop 24A, which is immediately reset by its Q output. That is, the flip-flop 24A detects the rise of the primary pre-synchronizing pulse PPSSP and outputs a short pulse D5. Similarly, the fall of the primary pre-synchronizing pulse PPSSP is detected by a flip-flop 24B, which outputs a short pulse D6.

On the other hand, the Q output of the flip-flop 21 is made high-level by the fall of the pulse PPSSP, enabling a gate 26A and disabling the gate 26B. Accordingly, the signal TXO is provided via the gate 26A to a reset terminal of a four-bit Johnson counter 28A. Upon each counting of four clock pulses TICK, the four-bit Johnson counter 28A reverses the logical level of its Q1 output, and its other outputs Q2, Q3 and Q4 are similarly reversed in level but are sequentially delayed in phase by one clock. The Q1 and Q2 outputs of the counter 28A are applied to a logical gate 28B, which provides at its output D4 a pulse every eight clock pulses TICK during the high-level period of the signal D2 which is applied to the reset terminal of the counter 28A. That is, a combination of the four-bit Johnson counter 28A and the logical gate 28B possesses the same function as that of the octal counter 28 in FIG. 4. Pulses in the outputs D4, D5 and D6 of the gate 28B, and the flip-flops 24A and 24B are provided via a gate 25 to the pulse generator 29, which responds to each input pulse to generate a pulse which is high-level for a period of time in which to count two clock pulses TICK (62.5 nS). The resulting pulse train is output as the output signal ETX of the encoder 19. In this way, the encoder 19 generates narrow pulses at the rise and fall of the primary pre-synchronizing pulse PPSSP (the fall corresponding to the rise of the pre-synchronizing pulse PSSP) and thereafter outputs a narrow pulse at each rise of the signal TXO and at regular intervals of 250 nS (eight clock pulses TICK) while the high level lasts.

Figure 10:
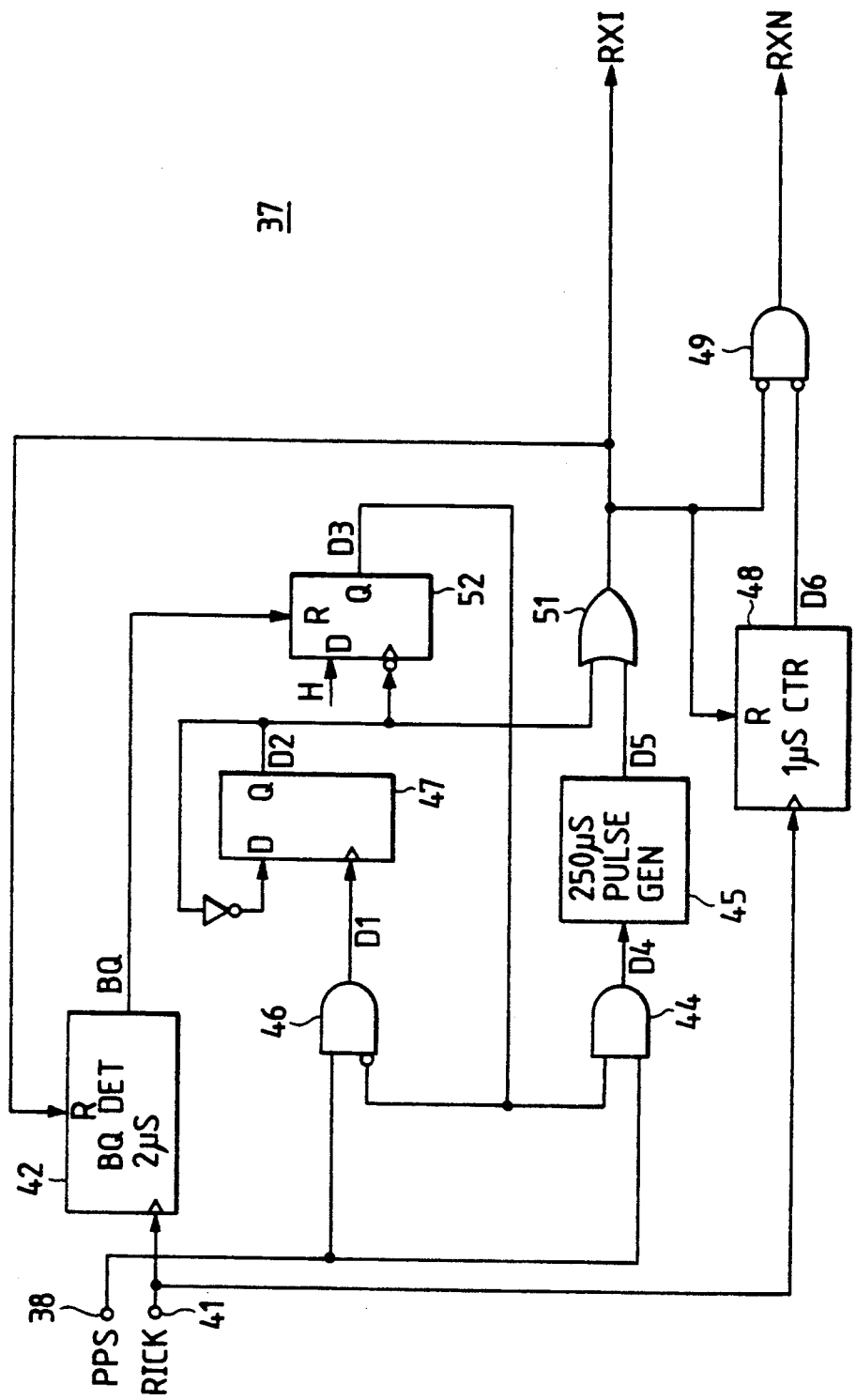
FIG. 10 is a block diagram of an encoder for use in the method of FIG. 7.

FIG. 10 illustrates an example of the construction of the decoder 37 for use in the transmission method depicted in FIG. 7, and FIG. 11 is a timing chart for explaining its operation. In this example, the bus quiet detector 42 which always counts the clock RICK is reset by the signal RXI which is the decoded result, and when the state in which the signal RXI is not output lasts for 2 $\mu$S, the bus quiet detector 42 makes its output BQ high-level. The timing chart in FIG. 11 is shown to start with the state in which the bus quiet period has lasted for more than 2 $\mu$S in the terminal gap TG and the output BQ is high-level. Accordingly, a flip-flop 52 is in its reset state and by its low-level Q output, a gate 44 is disabled and a gate 46 is enabled. The received pulse RPS is the first pulse D1 having passed through the gate 46 and makes the Q output of a flip-flop 47 high-level and the next pulse makes the Q output low-level, by which the primary pre-synchronizing pulse PPSSP is regenerated as indicated by D2 in FIG. 11. The primary pre-synchronizing pulse PPSSP is output via a gate 51, and by the fall of the pulse PPSSP, the flip-flop 52 reads therein a high level and makes its Q output D3 high-level, disabling the gate 44 and enabling the gate 46. Thereafter the received pulse RPS is provided as a signal D4 via the gate 44 to the pulse generator 45. Upon each application thereto of the narrow pulse (the signal D4), the pulse generator 45 outputs a pulse of a 250 nS width. Consequently, when input pulses are sequentially supplied every 250 nS as indicated by the signal D4, a pulse of a width corresponding to the number of pulses is generated as indicated by the signal D5. The output signal D5 of the pulse generator 45 is provided as the signal RXI via the gate 51 and is inverted in logic by a NOR gate 49, from which it is output as the signal RXN. The output signal RXI of the gate 51 is applied to a reset terminal of the counter 48 which always counts the clock RICK. When having counted 32 (1 $\mu$S) or more clock pulses RICK, the counter 48 decides that the string gap SG or terminal gap TG has been reached and makes its output D6 high-level, forcibly making the signal RXN low-level. In this way, the decoder 37 shown in FIG. 10 decodes, from the sequence of received pulses RPS, the signal RXI headed by the primary pre-synchronizing pulse PPSSP and the signal RXN headed by the pre-synchronizing pulse PSSP.

As described above, according to the present invention, the signal TXO and the signal TXN having the pre-synchronizing pulse PSSP as timing information, which constitute Manchester-biphase signals, are transmitted as one optical signal, or the signal TXO having the primary pre-synchronizing pulse PPSSP as timing information is transmitted as one optical signal, and this optical signal can be regenerated into the two Manchester-biphase signals RXI and RXN. Accordingly, the scale of the optical bus used can be reduced by one, as compared with that in the case of transmitting the two signals TXO and TXN as separate optical signals.

According to the present invention, a pulse train narrower than the original signals TXO and TXN is transmitted and at the receiving side each pulse is processed as a mere timing signal at its leading edge. Hence, even if the level of an input optical signal is so large that a limiter amplifier in the receiver circuit 36 is saturated to distort the pulse width, the signal can faithfully be regenerated, as long as the pulse width is smaller than that of the signal TXO; so that the dynamic range for the input level is enlarged. In other words, the optical signal input into each optical coupler is split into two optical signals, and consequently, an optical signal having passed through a number of optical couplers and an optical signal having passed through a small number of optical couplers connected to the optical bus 11 can be accurately regenerated, although the levels of their input optical signals appreciably differ. Where the pulse of each bit of the original signal TXO is rendered into an optical signal of a pulse width (62.5 nS) which is one-fourth of the original pulse width (250 nS), an allowable distortion in the receiver circuit 36 is four time larger than in the past in terms of the pulse width.

As described above, the duty ratio of the optical signal becomes appreciably smaller than the duty ratio of the original signal TXO (about 50%). Accordingly, the mark ratio of the optical signal, i.e. the ratio of the time during which a current flows in a light emitting element, is lower than in the case where the original signal TXO is converted directly to an optical signal. When a light emitting diode is employed as the light emitting element, the value of current which can flow therein is limited in view of the limit of the junction temperature of the diode, but current can flow in excess of a continuously flowable current value, if the time is very short. For example, when the continuous current application is rated at 50 mA, if the mark ratio of the optical signal is made $\frac{1}{8}$ and its pulse width is made sufficiently small, it is possible to flow a current which has a peak value of 400 mA, and hence the optical power can be made eight-fold. In the present invention, since a narrow optical pulse train is output, the optical power can be increased accordingly and many optical couplers can be connected to the optical bus.

When two terminals 14 simultaneously provide signals onto the optical bus 11 and a signal collision occurs, it is necessary to detect the collision, to stop the signal transmission and to discard received signals as false data. Now, let it be assumed, for example, that an original signal TXO1 of an incoming signal from a nearby terminal and an original signal TXO2 of an incoming signal from a distant terminal bear an overlapping timing relationship as shown on Rows A and B in FIG. 12. In this case, the received signal RPS obtained by directly converting the original signals TXO1 and TXO2 without changing their pulse widths assumes a waveform in which the pulse of a small level $P_2$ from the distant terminal overlaps the pulse of a large level $P_1$ from the nearby terminal as shown on Row C in FIG. 12, and the difference between the levels $P_1$ and $P_2$ is about 1000:1. It is very difficult to detect such an overlap of signals. In the present invention, however, since the width of each pulse of the original signal TXO is reduced to one-fourth, the possibility that the optical pulse of large level from the nearby terminal and the optical pulse of small level from the distant terminal, in this case, do not overlap as shown on Row D, is high and hence can easily be detected. In the Manchester code there is no possibility of two pulses existing in one bit (500 nS) and the reception of such a signal as shown on Row D indicates the occurrence of a signal collision, and therefore the collision can easily be detected. When the two optical signals are superposed completely, the signal collision cannot be detected. It is evident that the lower the mark ratio of the optical signal, the easier the detection of the signal collision.

As described above, according to the present invention, a pulse train derived from one or both of the Manchester-biphase digital signals TXO and TXN is transmitted as an optical signal, and at the receiving side the original Manchester-biphase digital signals TXO and TXN can be regenerated and the scale of the optical bus used can be reduced. In addition, the optical signal is transmitted as a narrow pulse, so that the dynamic range of the receiving level can be enlarged. Furthermore, since the pulse to be transmitted is a narrow pulse, an optical pulse of a high power can be output. Besides, the small mark ratio of the optical pulse allows ease in the detection of a signal collision.

It will be apparent that many modifications and variations may be effected without departing from the scope of the novel concepts of the present invention.

What is claimed is:

1. An optical bus transmission method wherein each terminal connected to an optical bus produces a series of narrow pulses a leading one of which is synchronized with the rise of a leading one of pulses of a second of first and second digital electric signals of Manchester-biphase codes, the others of which are synchronized with the rises of pulses of said first digital electric signal and those occurring every fixed period of time during the durations of the pulses of said first digital electric signal, said method comprising:
   a step wherein a series of said narrow pulses are converted into optical signals and transmitted as an optical pulse train to said optical bus;
   a step wherein said each terminal converts an optical pulse received from said optical bus into an electric pulse signal; and
   a step wherein said electric pulse signal is separated into its leading pulse and subsequent pulses, each of said subsequent pulses is converted into a pulse of a pulse width equal to said fixed period of time to regenerate said first digital electric signal and said second digital electric signal is regenerated from a polarity-inverted version of said regenerated first digital electric signal and said leading pulse.

2. An optical bus transmission method wherein each terminal connected to an optical bus produces a series of narrow pulses the leading two of which are synchronized with the rise and fall of a leading pulse of a first one of first and second digital electric signals of Manchester-biphase codes, the others of which are synchronized with the rises of pulses of said first digital electric signal subsequent to said leading pulse thereof and those occurring every fixed period of time during the durations of said subsequent pulses, said method comprising:
   a step wherein a series of said narrow pulses are converted into optical signals and transmitted as an optical pulse train to said optical bus; and
   a step wherein said each terminal converts an optical pulse received from said optical bus into an electric pulse signal, separates said electric pulse signal into two leading pulses and subsequent pulses, a first pre-synchronizing pulse rising and falling in synchronization with said two leading pulses is produced, said subsequent pulses are each converted into a pulse of a width equal to said fixed period of time and is regenerated as said first digital signal in combination with said first pre-synchronizing pulse to produce a regenerated first digital electric signal, and said regenerated first digital electric signal is polarity inverted to produce a regenerated second digital electric signal.

3. The optical bus transmission method of claim 1 or 2, wherein said narrow pulses each have a width which is less than one-fourth of one bit of said Manchester-biphase codes.

4. The optical bus transmission method of claim 1 or 2, wherein said optical pulse train from said each terminal is provided via first and second optical couplers to both of first and second buses and optical signals are received from said first and second buses via said first and second optical couplers, respectively.

* * * * *